United States Patent [19]

Perry

[11] Patent Number: 5,236,581

[45] Date of Patent: Aug. 17, 1993

[54] SPA WITH FILTER ASSEMBLY ACCESSIBLE THROUGH ITS COPING LIP

[75] Inventor: Loren R. Perry, Berrien Springs, Mich.

[73] Assignee: Conway Products Corporation, Kentwood, Mich.

[21] Appl. No.: 864,501

[22] Filed: Apr. 7, 1992

[51] Int. Cl.⁵ .................. B01D 35/147; B01D 35/02
[52] U.S. Cl. ......................... 210/130; 4/541.1; 4/541.3; 52/169.7; 210/169; 210/205; 210/295; 210/340; 210/416.2
[58] Field of Search ............... 52/169.7, 300; 4/506, 4/507, 509, 541.1, 541.2, 541.3; 210/143, 133, 136, 137, 169, 201, 203, 205, 206, 253, 254, 258, 282, 335, 340, 416.2, 418, 420, 341, 97

[56] References Cited

U.S. PATENT DOCUMENTS

| | | | |
|---|---|---|---|
| 4,462,125 | 7/1984 | Jakowicki | 4/506 |
| 4,630,634 | 12/1986 | Sasaki et al. | 137/268 |
| 4,705,629 | 11/1987 | Weir et al. | 210/340 |
| 4,780,197 | 10/1988 | Schuman | 210/136 |
| 4,942,630 | 7/1990 | Kantor et al. | 4/542 |
| 5,100,542 | 3/1992 | Landman et al. | 210/416.2 |
| 5,107,551 | 4/1992 | Weir et al. | 4/506 |
| 5,178,523 | 1/1993 | Cheng-Chung | 4/541.3 |

FOREIGN PATENT DOCUMENTS 3203218 8/1983 Fed. Rep. of Germany ...... 210/169

Primary Examiner—Joseph W. Drodge
Attorney, Agent, or Firm—Price, Heneveld, Cooper, DeWitt & Litton

[57] ABSTRACT

A spa having a filter assembly mounted in a sidewall and accessible through the coping at the top periphery of the spa. The filter assembly has a plurality of filter elements and a chemical dispensing mechanism easily accessible and replaceable through the coping. The filter assembly is downstream of the pump and heater to prevent cavitation erosion of the pump impeller. A pressure valve allows water to by-pass the filter assembly when clogged or operated at high pump rates. The top of the filter assembly is concealed in a well defined in the coping and closed by a cover having a profile matching that of the coping.

25 Claims, 2 Drawing Sheets

SPA WITH FILTER ASSEMBLY ACCESSIBLE THROUGH ITS COPING LIP

FIELD OF THE INVENTION

The present invention relates to whirlpool spas, and particularly to a filter assembly for use in such spas.

BACKGROUND OF THE INVENTION

Whirlpool spas are typically comprised of a molded, fiber reinforced plastic shell which is seated in a cabinet. The shell contains water which is circulated through a filter and a heater by a filter pump. Typically, a spa will use a single, two speed pump motor. The filtering and heating function is usually accomplished with the pump motor in the low speed mode.

The high speed mode of the pump motor is typically engaged when the spa is in use and the occupants desire a vigorous circulation of water through the jets within the spa. Alternatively, an optional, two pump system can be had wherein the low speed filter pump function and the high speed jet pump function are segregated into two separate pump and piping systems.

An optional air blower is often associated with the spa for injecting air bubbles into the spa. The heater, filter pump, jet pump and blower are typically located in the cabinet, generally below and to one side of the spa shell. A heater thermostat and an automatic timer for the filter pump are also typically located inside the cabinet. Only the on/off controls for the jet pump and the air blower, and sometimes optional spa light controls, are located on the lip of the spa shell so that they are accessible by a person using the spa. Usually, one must open a door on the side of the spa cabinet and reach into the cabinet in order to access or to service the primary controls, the heater, the filter, the pump(s) and the blower.

This is a somewhat awkward and cumbersome procedure, especially with respect to operation of the automatic timer controls and mode selection switches, which must be accessed on a regular basis. It is also a particularly cumbersome procedure to service or maintain the filter, as one must do approximately every month.

In order to change or clean the filter element, a valve on each side of the filter must be closed to keep the water in the spa shell from draining out of the filter housing when it is opened to remove the filter element. Then, the water must be drained from the filter housing itself. The filter housing must be opened and the filter element is then removed and either replaced or cleaned.

Because the foregoing is such an awkward procedure, some spa manufacturers provide a filter which is mounted in the top corner of the spa shell itself and which can be removed from the top of the spa. The cover for the filter opening is located at the top of the spa, above the water line such that the filter element sits in a normally covered well-like opening. When the cover is removed, the user pulls the filter element directly up out of the filter housing.

One drawback to the corner placement of the filter is the restriction of the interior shape of the spa shell since approximately eight inches are required to locate the filter opening in the corner of the spa shell. Thus, the filter protrudes into the spa bathing area and eliminates certain space otherwise available for bathing.

Top mounted filters can be divided into two categories: filters that operate under pressure and filters that operate under a vacuum. Many manufacturers that provide top mounted filters prefer to use vacuum filter systems. Many manufacturers prefer vacuum filters, not because they are a better filtration system, but because water can be drawn through submerged cartridges without the need for a pressure vessel. Vacuum cartridges may be totally exposed, and thus provide a less expensive system which is easy to service. Because the centrifugal pumps commonly used in vacuum filtration systems do not create a high vacuum, a small amount of debris on a vacuum filter cartridge will substantially reduce the flow to the pump. As the filter media becomes clogged, the suction side of the pump begins to operate under an elevated vacuum, causing cavitation bubbles to form which erode the pump impeller. To minimize this problem, the filter cartridge must be cleaned frequently or cartridges with larger surface areas must be used, requiring even more space in the spa interior.

Some manufacturers use a top mounted pressure filtration system in their spas. Pressure filtration systems are superior to vacuum filtration systems in that they provide longer cycles between cleaning using less filter surface area. However, because pressure filtration systems operate under pressure, prior art cartridges are enclosed in a pressure vessel having a diameter of eight inches or more. Even though this dimension is smaller than that required by vacuum filtration systems, it still presents problems in designing efficient and ergonomic seating in the spa. Hence, accessibly mounting adequately sized filters in spas without sacrificing seating space has been difficult in prior known spas.

SUMMARY OF THE INVENTION

In the spa of the present invention, the filter assembly is conveniently mounted in a sidewall of the spa, extending through the coping around the upper edge of the wall. The filter assembly is easily accessed but concealed by a cover having a profile identical to the coping of the spa. In addition, the present invention places multiple filters on the pressure side of the spa pump and utilizes pressure instead of suction to force water through the filter media.

In one embodiment of the invention, the filter assembly includes a plurality of pressure vessels, each having an inlet port coupled in parallel to an inlet line, and an outlet port coupled in parallel to an outlet line. The inlet and outlet lines are interconnected by a pressure valve so as to by-pass the filtration assembly when a predetermined pressure level exists in the inlet line.

In another embodiment of the invention, the filter assembly includes at least two tubular canisters, each adapted to be sealed at a first end by a removable cap and interconnected at a second end by a manifold. The manifold includes a first passage extending transversely to the canister and connected to the inlet line. An outlet port is also provided in the manifold oriented substantially parallel to the longitudinal axis in the canister. The outlet port of each pressure vessel is coupled in parallel to an outlet line. The inlet and outlet lines are interconnected by a check valve, by-passing the filter assembly, adapted to relieve pressure in the inlet line.

In another form of the invention, each canister has an inner concentric pipe extending from the outlet line. The concentric pipe causes incoming water to flow up the canister and through a substantial portion of the filter media before being discharged to the outlet line.

At least one of the canisters includes a chemical feeder integral with the top. The feeder may be adjusted at the top to introduce the right amount of chemical into the water within the canister.

Advantages provided by this invention are longer filter and pump life. Since the pump is ahead of the filtration system, the pump can draw water directly from the spa reservoir, and uses pressure to force water through the filter assembly thereby avoiding cavitation erosion of the pump impeller due to clogged filter media and placement of the filter on the suction side of the pump. Likewise, multiple filters are used thereby reducing the frequency of clogging. Because the filtration assembly has more than one filter cartridge, the size of each can be reduced and both can be conveniently and accessibly mounted in the upper surface of the spa without consuming seating area. Yet another advantage associated with the reduced filter size is the ability to conceal the tops of the filtration assembly beneath a cover matching the design of the coping. The filtration system and an accompanying chemical feeder are also easily accessible by the user.

DETAILED DESCRIPTION OF THE PREFERRED EMBODIMENTS

Figure 6:
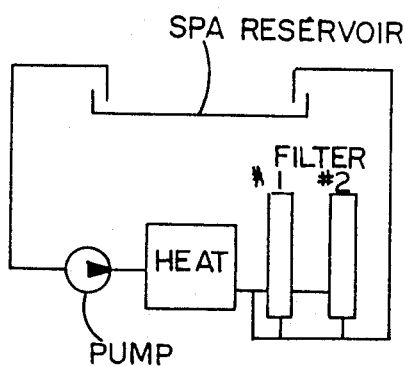
FIG. 6 is a schematic of the spa circulation system including the filter assembly.
Figure 1:
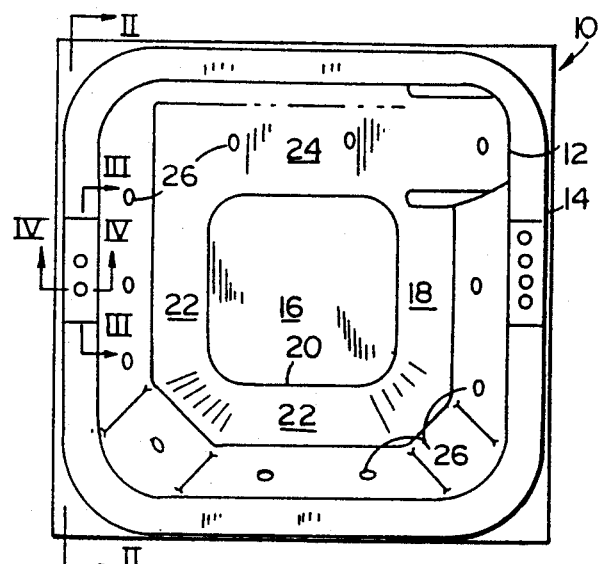
FIG. 1 is a plan view of a spa.
Figure 2:
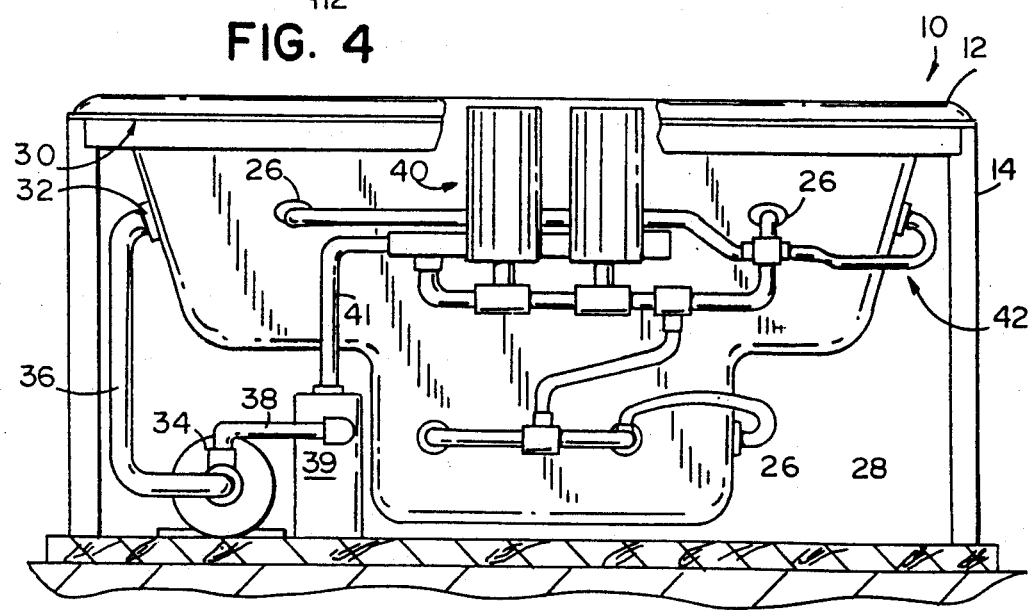
FIG. 2 is an elevational view of the spa taken along lines II—II.

Referring now to the drawing FIGURES, especially FIGS. 2 and 6, spa 10 includes a spa shell 12 mounted in a frame or cabinet 14. Spa shell 12 is typically formed from an acrylic fiber reinforced plastic resin to form a reservoir 16 for retaining a volume of water. Shell 12 includes a seating surface 18 surrounding a foot well 20. Seating surface 18 may have a variety of layouts and may include one or more benches 22 and loungers or recliners 24, each adapted to comfortably position a bather within the reservoir. Spa shell 12 includes a plurality of water jet ports 26 which extend through the spa shell at various locations on benches 22 and recliners 24, each adapted to force a jet of water into reservoir 16 to vigorously circulate the water and provide therapeutic massage for the bather. A water filter assembly 40 for cleaning and conditioning the water forced through jet ports 26 is positioned at one side 15 of spa shell 12 to allow convenient access through a cover 122.

Spa shell 12 has an upper lip or coping 30 which rests along the upper edge of cabinet 14 to support and suspend spa shell 12 in a substantially horizontal position. Water in reservoir 16, formed by spa shell 12, flows into the plumbing 28 through weir gate 32 or another point formed in spa shell 12 and coupled to a water pump 34 by conduit 36. Pump 34 is typically a centrifugal pump having a low pressure or suction side coupled to conduit 36 and adapted to draw water from reservoir 16 through weir gate 32. Pump 34 may be a two-speed pump to provide vigorous water circulation. A high pressure side of centrifugal pump 34 is coupled to a conduit 38 having an opposite end coupled to an optional water heater 39, which in turn, is coupled to the inlet side of filter assembly 40 by way of line 41. Water from filter assembly 40 is introduced to a plumbing network 28 interconnecting water jets 26 so as to forcefully reintroduce the water back into reservoir 16. Plumbing network 28 is typically polyvinyl chloride pipe, or other appropriate conduit, interconnected by various couplers to assure a watertight seal with the adjacent joints. Once the network of plumbing lines have all been interconnected to the water jets and the assembly is complete, the exterior 44 of spa shell 12 may be sprayed with a semi-rigid insulation material 45 designed to anchor plumbing 28 in place and to prevent heat loss through spa shell 12.

Figure 3:
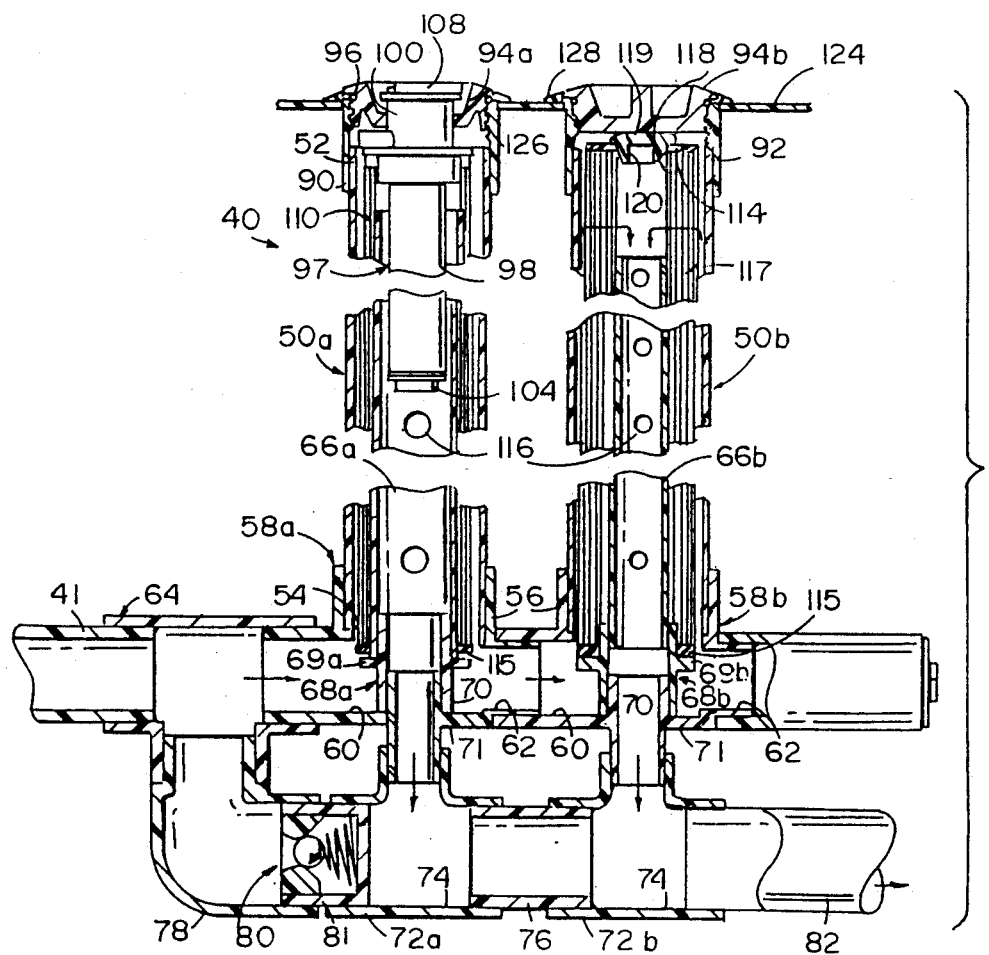
FIG. 3 is an elevational section view of the filter assembly in the spa taken along lines III—III in FIG. 1.

Referring now to FIG. 3, filter assembly 40 includes at least two tubular bodies or canisters 50a, 50b open at first and second ends 52 and 54, respectively. Second end 54 of each canister 50 is tightly received within a sleeve 56 of manifold coupler 58. Each coupler 58 includes at least two conduits or ports 60 and 62 which extend therethrough at an angle with respect to sleeve 56 and canister 50. Ports 60, 62 are in fluid communication through coupler 58 with the interior of each canister 50. It is preferred that ports 60 and 62 be located on opposite sides of each coupler 58 and have dissimilar outside diameters so that port 62 of coupler 58a may be received within port 60 of adjacent coupler 58b. In the alternative, adjacent base couplers 58a, 58b and their respective ports 60 and 62 may be interconnected by either an interior or exterior sleeve to make the connection.

In a preferred embodiment, such as shown in FIG. 3, two canisters 50a, 50b each having couplers 58 at their second end 54, are interconnected by port 62 of canister 58a received within port 60 of canister 58b. Port 60 of canister 58a is received within one end of T-coupling 64 which, in turn, is coupled to conduit 41 extending from pump 34 and heater 39.

In the interior of each canister 50a, 50b, and concentric therewith, is an inner cylinder 66a, 66b, each containing perforations 67 spaced periodically along their length. Cylinder 66a concentrically receives a tubular coupler 68a tightly therein, stopped by flange 69. An opposite end of coupler 68a concentrically receives a nipple 70a extending through the bottom 71 of manifold 58a. The lower end of nipple 70 is received within and coupled to T-coupler 72a. Cylinder 66b within canister 50b, and having a smaller outside diameter than 66a, is concentrically received within one end of tubular coupler 68b having an outer flange 69. Coupler 68b in turn receives nipple 70b extending through bottom 71 of manifold 58b. The lower end of nipple 70b is received within and coupled to T-coupler 72b. Each T-coupler 72 includes a conduit 74 which is perpendicular to and forms a "T" with respect to the lower ends of nipples 70a and 70b. T-couplers 72a and 72b are interconnected by a section of pipe 76, thus placing inner cylinders 66a and 66b in fluid communication with each other.

An elbow coupler 78 interconnects the base of one side of T-coupler 64 with T-coupler 72a to form a shunt. T-coupler 72b has its free end coupled to a pipe or conduit 82 extending to plumbing network 28 interconnecting all of spa jets 26. A pressure actuated valve 80, such as a bias flap valve, is positioned to the interior of coupling 81 between elbow 78 and T-joint 72a and preferably is a one-way check valve adapted to allow fluid to pass in a one-way direction, such as from left to right in FIG. 3.

Figure 4:
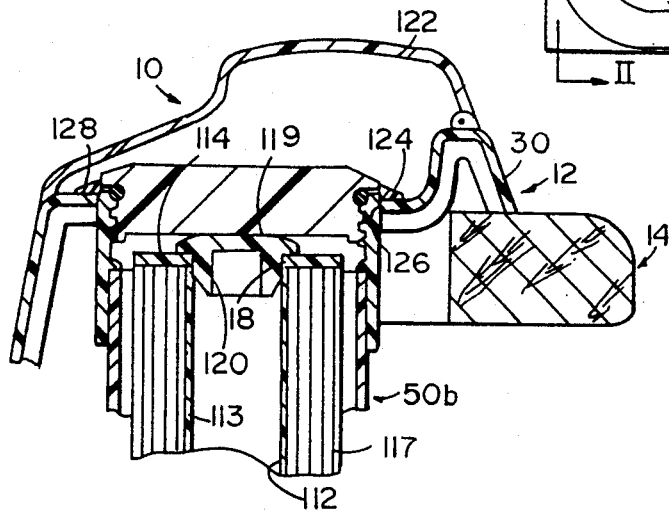
FIGS. 4 and 5 are enlarged, cross-sectional views of the upper portion of the filter assembly with FIG. 5 oriented at a right angle to that of FIG. 4.
Figure 5:
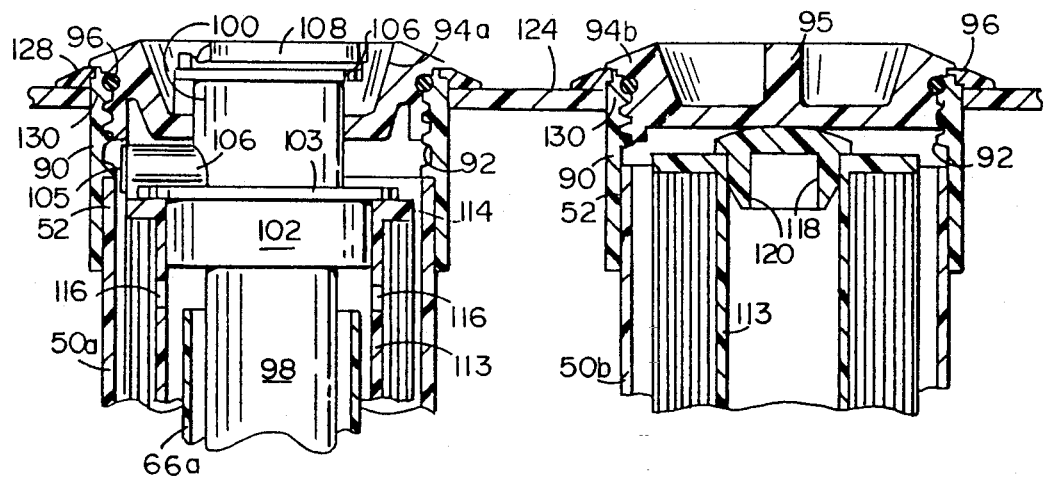

As is best seen in FIGS. 4 and 5, top or first end 52 of each canister 50 is received by an external sleeve 90 and secured therein. Sleeve 90 has a threaded interior surface 92 adapted to threadably engage a top 94. An O-ring 96, disposed around top 94, is adapted to sealingly engage threaded inner surface 92 of sleeve 90 to form a tight seal therebetween.

Extending through top 94a, and concentric therewith, is a chemical dispenser assembly 97 including a chlorinator body 98 bonded at its top to a depending, cap-coaxial sleeve 100 to form a water-tight seal. Depending sleeve 100 includes a flow regulator valve assembly 101 mounted in cap 94a. An upper cylindrical sleeve 102, having a filter top support flange 103 is concentric with depending sleeve 100 and is supported by regulator valve assembly 101.

Sleeve 98 extends downwardly into the interior of canister 50a and inner cylinder 66a. Sleeve 98 is closed at its bottom end by a check valve assembly 104 preferably threaded into the lower open end of the chlorinator sleeve 98. Valve assembly 104 operates to limit fluid flow from the interior of housing 98 into inner cylinder 66a and prevents fluid flow from inner cylinder 66a into the chlorinator body.

Regulator valve assembly 101, housing 98, valve assembly 104 and the elements interior to housing 98 comprise a secondary water treatment system additional to the water filtration system. Regulator valve assembly 101 includes a water treatment prescreen 105 for coarse-filtering the pressurized water coming in from inlet 60 in coupler 58. The prescreen covers a regulator inlet tube 106 extending from the prescreen to the interior portion of the regulator valve assembly. Regulator valve assembly 101 further includes a threaded chemical regulator needle valve 108 extending inwardly from the top for controlling the flow of pressurized water to chlorinator body 98. Regulator valve 108 includes a pair of 0-rings (not shown) to provide a water-tight and air-tight seal. Valve 108 is movable through a threaded engagement in and out of a sleeve 100 mounted to cap 94a. Valve 108 may include numerals or other indicia (not shown) for giving an indication of the relative position of the valve. Valve 108 is movable in the housing to limit or close off the fluid flow from regulator inlet tube 106 to chlorinator body 98. Preferably, chemical dispenser assembly 97 is of the type shown and disclosed in U.S. Pat. No. 4,780,197, assigned to Rainbow Lifegard Products, Inc. of El Monte, California, the disclosure of which is incorporated herein by reference.

Adjacent canister 50b has its first end 52 received within a sleeve 90 having a threaded upper end for externally threaded cap 94b. An 0-ring 96 about cap 94b and above its threads is adapted to engage the interior of sleeve 90 and seal the top of canister 50b. Cap 94b also includes a grasping flange 95 to allow twist-off removal for access to the filter.

Each canister 50 is adapted to receive a filter cartridge well-known in the art. It is preferred that each cartridge be made from a material which may be cleaned in order to reuse the same cartridge. Cartridge 110 may be a pleated porous and permeable material 111 adapted to strain debris from the water passing therethrough. Pleated filter media 111 is retained in a cylindrical form by a spool 112 having a tubular body 113 terminating in upper and lower end plates 114 and 115, respectively. Body 113 of cartridge 110 is centered within canister 50a by inner cylinder 66a, and chemical dispenser 97 depending from top 94a. The inside diameter of body 113 is sufficient to receive inner cylinder 66a and contained openings 116 to allow fluid to pass therethrough.

Cartridge 117 within canister 50b is of substantially the same construction as cartridge 110 but has a smaller diameter body 113. Cartridge 117 is centered within canister 50b by inner cylinder 66b and has lower end plate 115 engaging flange 69b around coupler 68b. Opening 18 of tubular body 113 at the upper end of plate 114 is closed by a cap 119. Cap 119 has a projection 120 with an outside diameter slightly larger than the inside diameter of body 113. Projection 120 prevents water from flowing from the exterior of the filter 117, through opening 118, and down through inner cylinder 66b. In a similar fashion, collar 102 about chemical housing 98 engages the top of cartridge 110 within canister 50a to force fluid therein through the filter media.

Illustrated in FIG. 4 is the top rail of cabinet 14 supporting the upper portion or coping 30 of spa shell 12. The profile of coping 30, around the perimeter of spa shell 12, is matched by filter assembly cover 122. Where filter assembly 40 is located along the sidewall of spa 12, coping 30 is molded to produce a substantially flat platform 124 to provide a mounting surface for upper edge or ends 52 of canisters 50a, 50b. Each canister 50a, 50b is suspended in a hole 126 and retained therein by a retaining plate 128 fixed to an upper end 130 of sleeve 90. Retaining plate 128 may be fixed to the upper end of sleeve 90 by an adhesive, or mechanically through the use of threaded surfaces. In this way, each filter canister, along with sleeve 90 and plate 12B, may be easily removed from spa shell 12 for servicing. Each of the components described above, other than filter cartridge 110, may be made from PVC, urethane or other moldable plastic.

Referring to the drawing FIGURES in general, operation of the invention will now become apparent. A suitable filter cartridge such as 110 is loaded into canister 50a. Cartridge 110 is of sufficient length to extend from flange 69a, located at the bottom of manifold coupler 58a, to the bottom edge of collar 102 of chemical dispenser 97. The outside dimensions of cartridge 110 are such as to provide sufficient clearance between the inner wall of canister 50a and the filter media to allow water to flow upwardly from port 60. Similarly, the inside diameter of body 113 is such to provide a space between the outer surface of inner cylinder 66a. Top 94a and housing 98 are lowered into canister 50a such that housing 98 is received within inner cylinder 66a. Tightening of cap 94 on to canister 50a causes collar 102 to seal against upper plate 114 at the top of filter cartridge 110, thus forcing the water to pass through the filter media in cartridge 110. A lesser volume of water also passes along the secondary flow path through the chemical dispensing system and serves as a solvent for the chemical dispensing system. The water passing into regulator valve assembly 101 is pressurized at a pressure substantially equal to that presented to the outside of the filter element; such water is filtered through prescreen 105 and passes along regulator inlet 106. The filtered water passes through the regulator valve assembly and down into the interior of depending sleeve 100, over the chemicals contained within chlorinator body 98, and out through the bottom of end cap 104. The chemically treated water flows down through inner cylinder 66a and back into spa 10.

In a similar fashion to that of canister 50a, filter cartridge 117 is inserted into canister 50b so that tubular body 113 receives inner cylinder 66b. Cartridge 117 is lowered so that lower plate 115 engages and seals with flange 69b extending from coupler 68b in manifold 58b. Opening 118, defined in upper plate 114, is sealed by cap 119. Top 94b is inserted into canister 50b and threadably engaged so as to close the canister.

Water received from pump 34 and heater 39 is introduced through conduit 41 into T-coupling 64. The water entering coupling 64 passes through ports 60 and 62 to fill each canister 50a, 50b. Water flowing into canisters 50a, 50b passes through filter media within each filter cartridge and exits through inner cylinder 66a, 66b down into conduit through T-junctions 72a, 72b. From conduit 82 the water is then passed to spa jets 26 and recirculated into servoir 16 of spa 10.

Water entering canister 50a has a portion diverted through chemical dispenser 97. Water entering dispenser 97 enters prescreen 105 and inlet 106 at a pressure equivalent to that existing in canister 50a. The water passes through valve 108 and down into chlorinator body 98 containing the chemicals. The water is forced over the chemicals and out through end cap 104 to reenter the reservoir.

If filter cartridges 110-118 become so dirty that they are unable to filter water effectively, or if spa 10 is equipped with a two-speed pump producing an influx of water which exceeds the filter capacity, the resultant excessive pressure causes check valve 80 to open allowing water to by-pass filter assembly 40 and flow directly into conduit 82 to be reintroduced into spa 10.

The above description is considered that of the preferred embodiment only. Modifications of the invention will occur to those who make or use the invention. Therefore, it is understood that the embodiment shown in the drawings and described above is merely for illustrative purposes and is not intended to limit the scope of the invention, which is defined by the following claims.

The embodiments of the invention in which an exclusive property or privilege is claimed are defined as follows.

1. A spa comprising:
   a reservoir for containing water and having an upper coping lip extending substantially around a perimeter of said reservoir to define at least three sides;
   at least one opening in said coping lip along at least one of said three sides;
   a filter assembly disposed within said at least one opening in said coping lip and in fluid communication with said reservoir through an inlet and an outlet line, said filter assembly having a plurality of closed pressure vessels coupled in parallel to said inlet line and to said outlet line; and
   means interconnecting said reservoir and said inlet line for pumping water from said reservoir through each of said plurality of pressure vessels in said filter assembly.

2. A spa defined in claim 1, wherein each of said plurality of pressure vessels is tubular having a first end interconnected to said inlet line and outlet line an a second end adapted to be sealed by a cap.

3. A spa as defined in claim 2, wherein each of said plurality of tubular pressure vessels has said second end fixed in said opening in said coping lip.

4. A spa as defined in claim 3, further comprising a cover adapted to conceal said at least one opening in said coping lip.

5. A spa as defined in claim 2, wherein at least one of said plurality of tubular pressure vessels includes a chemical dispenser.

6. A spa as defined in claim 5, wherein said chemical dispenser is adjustable through a cap closing said at least one tubular pressure vessel.

7. A spa as defined in claim 2, wherein at least one of said tubular pressure vessels is adapted to receive a tubular filter medium.

8. A spa as recited in claim 1, wherein said means for pumping includes a centrifugal pump.

9. In a spa having a reservoir for containing a volume of water and having at least three sides defined by a coping lip extending around an upper perimeter of said reservoir, the improvement comprising:
   at least one cavity defined in said coping lip along at least one of said three sides of said reservoir, said cavity having at least one opening defined therein; and
   a filter assembly disposed in said opening, said filter assembly having a plurality of closed containers coupled in parallel to each other by an inlet line and an outlet line in fluid communication with the reservoir, with at least one of said containers adpated to receive a filtering medium.

10. The improved spa as recited in claim 9, wherein each of said containers includes:
    a tube having an interior volume and a first and second end defining a longitudinal axis;
    a cap adapted to threadably seal said first end of said tube; and
    a manifold mounted over said second end of said tube, said manifold including a first passage in fluid communication with said interior volume, and a second passage in fluid communication with said interior volume extending from said manifold at an angle to said first passage.

11. The improved spa as recited in claim 10, wherein said containers have said respective first passages interconnected together in series to said inlet line.

12. The improved spa as recited in claim 10, wherein said containers have said respective second passage interconnected in parallel to said outlet line.

13. The improved spa as recited in claim 9 further comprising means, interconnecting said inlet line to said outlet line, for controlling pressure in said inlet line.

14. The improved spa as recited in claim 13, wherein said pressure controlling means includes a pressure-actuated valve.

15. The improved spa as recited in claim 14, wherein said valve is a one-way valve.

16. The improved spa as recited in claim 9, further comprising a chemical dispenser disposed in at least one of the said containers.

17. The improved spa as recited in claim 16, further comprising a filter medium in each of said containers.

18. In a spa having a reservoir defined by at least three sides and a bottom, each of said three sides having a coping defined along an upper edge, the improvement comprising:
   a depression formed in said coping along at least one of said three sides and having at least one hole extending therethrough;
   a cover concealing said depression and having a profile substantially identical to said coping;

at least two canisters, each having a first end extending through said opening and above the bottom surface of said depression, and a second end disposed below said coping;

a cap adapted to close the first end of each canister;

a manifold adapted to receive the second end of each canister, each manifold interconnected in series to each other by a first passage, and canisters each having a second passage extending therethrough at an angle to said first passage, each of said first and second passages being in fluid communication with an interior of said at least two canisters;

a first and second conduit in fluid communication with said reservoir, said first conduit coupled to said first passage in each of said manifolds, and said second conduit coupled in parallel to said second passage of each manifold; and valve means interconnecting said first and second conduit for controlling a pressure present in said first 19. The improved spa as recited in claim 18, further comprising:

a filter media disposed in at least one of said canisters; and means in at least one of said canisters for dispensing a chemical.

20. The improved spa as recited in claim 19, wherein said chemical dispensing means are an integral part of said at least one cap and having means for adjusting an amount of said chemical inserted into said canister.

21. In a spa having a reservoir defined by at least three sides, each of said three sides having a coping lip defined along an upper edge, the improvement comprising:

a depression formed in said coping lip above at least one of said three sides, said depression having at least one hole extending through a bottom surface thereof;

at least two closed canisters disposed in said opening, said canisters being coupled in parallel with each other through a first conduit receiving water from the reservoir and a second conduit returning water to the reservoir, said canisters each adapted to receive, at least one of a filter element and a water treating chemical dispenser through said first end above said coping; and a cap threadably closing said first end of each canister.

22. A filter assembly configured to extend through the coping lip of a spa comprising:

an inlet line extending from said spa;

an outlet line extending to said spa;

at least two canisters coupled in series with each other through a first conduit coupled to said inlet line, and coupled in parallel to each other through a second conduit coupled to said outlet line, said canisters each adapted to receive at least one of a filter element and a water treating chemical dispenser; and a pressure actuated shunt interconnecting said inlet and outlet line.

23. A spa comprising;

a reservoir for containing water and having an upper coping lip extending substantially around a perimeter of said reservoir to define at least three sides;

at least one opening in said coping lip along at least one of said three sides;

a filter assembly disposed within said at least one opening in said coping and in fluid communication with said reservoir through an inlet and an outlet line, said filter assembly having a plurality of closed pressure vessels coupled in parallel to said inlet line and to said outlet line, and each of said vessels having a first end interconnected to said inlet and outlet lines and a second end adapted to be sealed by a cap; and means interconnecting said reservoir and said inlet line for pumping water from said reservoir through said pressure vessels in said filter assembly.

24. In a spa having a reservoir for containing a volume of water and having at least three sides defined by a coping lip extending around an upper perimeter of said reservoir, the improvement comprising:

at least one cavity defined in said coping lip along at least one of said three sides of said reservoir, said cavity having at least one opening defined therein; and a filter assembly having a plurality of containers coupled in parallel to each other by an inlet line and an outlet line in fluid communication with the reservoir, at least one of said containers adapted to receive a filtering medium;

a cap adapted to threadably seal a first end of each container;

a manifold mounted over a second end of each container, each manifold interconnected in series to each other by a first passage, and having a second passage extending therefrom at an angle to said first passage, each of said first and second passages being in fluid communication with an interior volume of said containers; and at least one of said containers adapted to receive a filter medium.

25. A spa comprising:

a reservoir for containing water;

a housing for said reservoir having coping lip defining a plurality of sidewalls surrounding said reservoir and defining a space between said reservoir and said sidewalls;

a filter assembly located in the space between one of said sidewalls and said reservoir, said filter assembly extending through said coping lip and having a plurality of closed canister members joined in parallel to a water inlet line;

an outlet line extending from each of said canister members, said outlet lines joining, in parallel to one another, a water outlet flow line;

a filter medium in each of said canister members interposed between said inlet and said outlet lines;

a pump for recirculating water in said spa, connected to said inlet line for pumping water through said plurality of canister members and the respective filter media in parallel fashion, whereby said filter assembly can be sufficiently thin without sacrificing filter area to fit compactly between said housing sidewall and said reservoir.

* * * * *

UNITED STATES PATENT AND TRADEMARK OFFICE
CERTIFICATE OF CORRECTION

PATENT NO. : 5,236,581

DATED : August 17, 1993

INVENTOR(S) : Loren R. Perry

It is certified that error appears in the above-identified patent and that said Letters Patent is hereby corrected as shown below:

Column 1, line 11:
    After "plastic" delete --.--.

Column 6, line 12:
    "Opening 18" should be --Opening 118--.

Column 6, line 35:
    "plate 12B" should be --plate 128--.

Column 7, line 17:
    After "conduit" insert --82--.

Column 7, line 64:
    "an a" should be --and a--.

Column 8, line 57:
    After "of" delete --the--.

Column 9, line 8:
    After "and" delete --canisters each--.

Column 9, line 21:
    After "first" insert --conduit.--.

Column 10, line 7:
    After "coping" insert --lip--.

Column 10, line 44:
    After "having" insert --a--.

UNITED STATES PATENT AND TRADEMARK OFFICE
CERTIFICATE OF CORRECTION

PATENT NO. : 5,236,581
DATED : August 17, 1993
INVENTOR(S) : Loren R. Perry

It is certified that error appears in the above-indentified patent and that said Letters Patent is hereby corrected as shown below:

Column 10, line 44:
    After "having" insert --a--.

Signed and Sealed this

Twentieth Day of September, 1994

Attest:

BRUCE LEHMAN

Attesting Officer      Commissioner of Patents and Trademarks